Sept. 22, 1959       G. J. KREIER, JR       2,905,580
METHOD FOR MAKING COLOR-PATTERNED GLASS FIBER SHEET
Filed Oct. 21, 1955

PHASE I

1. PLACE CELLOPHANE SHEET ON TABLE
2. LAY SURFACING MAT FIBERGLAS ON TOP
3. POUR PIGMENTED POLYESTER RESIN ON FIBERGLAS
4. PLACE SECOND CELLOPHANE SHEET ON TOP
5. APPLY ROLLING PRESSURE TO EXPEL AIR
6. ALLOW MIXTURE TO POLYMERIZE TO "HARD GEL" STAGE, FORMING RIGID SHEET
7. DIE-CUT SHEET TO VARIOUS SHAPES & SIZES

PHASE II

1. PLACE PATTERN ON TABLE
2. PLACE CELLOPHANE SHEET ON PATTERN
3. ADD LAYER OF MAT FIBERGLAS ON CELLOPHANE
4. ADD UNPIGMENTED POLYESTER RESIN
5. LAY DIE-CUT PIECES OF COLORED SHEETS FROM PHASE I OVER RESIN ON PATTERN
6. LAY ADDITIONAL MAT FIBERGLAS ON PIECES
7. ADD ADDITIONAL POLYESTER RESIN
8. COVER WITH SHEET OF CELLOPHANE
9. APPLY ROLLING PRESSURE TO EXPEL AIR
10. ALLOW MIXTURE TO POLYMERIZE APPROX. 45 MIN. TO FORM LAMINATED SHEET
11. BAKE LAMINATED SHEET FOR 1 HR. AT APPROX. 225°F.

INVENTOR.
GEORGE J. KREIER, JR.
BY Anthony J. Turchetti
HIS ATTORNEY

United States Patent Office 2,905,580
Patented Sept. 22, 1959

2,905,580

METHOD FOR MAKING COLOR-PATTERNED GLASS FIBER SHEET

George J. Kreier, Jr., Philadelphia, Pa.

Application October 21, 1955, Serial No. 541,987

9 Claims. (Cl. 154—121)

This invention relates to a method for making Fiberglas sheet for architectural use, and particularly to a method for making color-patterned Fiberglas sheet, simulating the conventional stained glass.

Stained glass, as is customarily used in church windows and the like, is a comparatively high cost item. Yet, for many years, it has enjoyed widespread use notwithstanding its expensive nature, because of the absence of a suitable substitute material to take its place. Today, however, with the ever increasing technological developments in the field of plastics, there are certain plastics which, if properly developed, can replace stained glass in architectural applications at a great savings in cost. I have particularly in mind the use of Fiberglas sheets made from Fiberglas bonded in a polyester resin. As is well known in the art, sheets of this type exhibit high strength characteristics as well as durability upon exposure to the atmospheric elements. However, the problem up to the present time has been one of determining how to form such sheets so as to simulate stained glass as to color variation and color definition.

Prior attempts at making colored Fiberglas sheets, using only a polyester system, have resulted in sheets of a single color; while attempts at achieving patterned sheets by the inclusion of foreign materials, such as colored fabrics and the like, in a laminated sheet have resulted in the production of inartistic and structurally inferior sheets devoid of the clear-cut color definition found in stained glass. It has been found that the foreign material decreases the strength of the sheet and contributes to its delamination.

With the above in mind, it is the basic objective of the present invention to provide an improved method for making color-patterned Fiberglas sheet.

It is another object of this invention to provide an improved method for making color-patterned Fiberglas sheet having clear-cut color variation and definition.

A further object of the present invention is to provide an improved method for making color-patterned Fiberglas sheet which simulates stained glass as to color translucency.

Another object of this invention is to provide a method for making color-patterned Fiberglas sheet exhibiting high strength characteristics and resistance to delamination.

A still further object of the present invention is to provide an inexpensive method for making color-patterned Fiberglas sheet.

These objects, together with other objectives and advantages to be derived from the present invention, will at once become apparent from a reference to the following detailed description and the accompanying drawing illustrating the present method in step-by-step legend wherein:

Phase I illustrates the sequence of steps followed in the formation of the colored sheets from which are cut colored platelets used in forming the laminated color-patterned Fiberglas sheet.

Phase II illustrates the sequence of steps followed in forming the laminated color-patterned Fiberglas sheet.

Referring to the drawing, the steps followed throughout Phase I will now be described in detail. First, a sheet of ordinary cellophane paper is placed upon a hard flat surface, such as a table top. Then a layer of surfacing mat Fiberglas is placed on top of the cellophane sheet. Mat Fiberglas is the term applied to a multiplicity of individual strands of glass fibers approximately one-half inch long and arbitrarily combined in disoriented fashion to form a thin sheet or mat. The use of 15–20 mil surfacing mat is preferred for use in the present method. Next, a liquid binder, such as polyester resin, to which a desired color pigment has been added is poured at room temperature over the layer of surfacing mat Fiberglas, finding its way into the interstices thereof so as to thoroughly surround the individual fibers. A second sheet of cellophane is then placed on top of the Fiberglas/resin mixture and a light rolling pressure is applied thereto by the use of a suitable roller so as to expel any air which might be entrapped within the mixture. Polymerization of the resin being spontaneous at room temperature, the Fiberglas/resin mixture is permitted to partly polymerize to a "hard gel" stage, having a consistency similar to that of hard rubber. This incomplete polymerization of the polyester resin is of great importance in the subsequent formation of the color-patterned laminated sheet, as will be described below. Since the rate of polymerization of the polyester resin at room temperature is comparatively slow, the now-rigid partially polymerized sheet may be stripped from the cellophane sheets and die-cut to platelets of various shapes and sizes for use in forming the color-patterned Fiberglas sheet. It is to be noted that being partially polymerized, the resin sheet will not chip during the die-cutting operation as would happen if completely polymerized. Naturally, many such sheets of different colors may be made at the same time so as to provide for color variation in the finished color-patterned sheet.

Looking now at Phase II of the present method as depicted diagrammatically in the drawing, the sequence of steps followed in forming the color-patterned Fiberglas laminated sheet will now be described. First, a pattern for the desired arrangement of the colors in the finished sheet is placed on a hard flat surface, such as a table top or the like. The pattern is then covered with a sheet of transparent cellophane and a layer of Fiberglas mat (¾ to 1½ oz./sq. ft.) is placed on top thereof. Next, unpigmented, clear catalyzed polyester resin is poured at room temperature over the layer of Fiberglas mat so as to thoroughly surround the individual fibers thereof. Then, the die-cut pieces or platelets of the partially polymerized colored sheets, formed in accordance with the steps of Phase I, are placed on top of the Fiberglas/resin mixture in compliance with the pattern designations as to position and color. These pieces are then covered with a second layer of Fiberglas mat of the same weight as the first layer, and additional unpigmented polyester resin at room temperature is poured over the Fiberglas, commingling therewith. The several layers of Fiberglas, platelets and polyester resin are then covered with a second sheet of cellophane, and a slight rolling pressure is applied thereto by the use of a roller so as to expel entrapped air therefrom. The Fiberglas/resin layers with the partially polymerized platelets therebetween are permitted to polymerize or "set" for approximately 45 minutes whereupon a unitary laminated rigid sheet is formed. It will be noted at this point that since the colored platelets have previously been only partially polymerized, they will now polymerize further together with the fresh unpolymerized resin mixture so as to form a rigid homogeneous sheet having color variation. The colors will not run because they are individual platelets rather than mere dyes, and so clear-cut color definition is obtained. After the requisite set period has passed, the now-rigid sheet is placed in an oven where it is baked for approximately 1 hour at a preferred temperature of 225° F. The sheet is then removed from the oven and allowed to cool, whereafter it may be trimmed as desired. This finished product may then be used as an inexpensive and structurally superior substitute for stained glass. It is to be particularly noted that Fiberglas sheets of this type will not break as easily as glass.

The color-patterned Fiberglas sheet formed in accordance with the method of the present invention has been found to exhibit clear, glass-like shades of clear-cut definition. In addition, the color-patterned sheet is not in any way degraded, as has been the case in the past wherein foreign materials have been introduced for pattern effect, and, because it is a purely polyester system, it will not delaminate as will other systems which make use of foreign materials. Furthermore, the strength of my improved laminate and its structural and chemical characteristics generally, will remain substantially unchanged practically indefinitely.

If it is desired to reduce the cost, the color platelets may be made from a pure pigmented polyester resin film, eliminating the Fiberglas reinforcement in Phase I. And to obtain pattern variations, conventional silk screen methods may be used to obtain a linear design, such as a fish or the like, within a platelet; while additional colors may be obtained by overlapping platelets within the laminate body during Phase II. Polymerizable resins other than polyester resin may also be used in the present method, such as the phenolic and epoxy resins, while other reinforcement materials such as nylon and the like may be used in the place of Fiberglas.

While the above description of the present method has been limited to the particular series of steps disclosed, variations thereof are possible without departing from the spirit of the invention. It is to be understood, therefore, that the invention is not to be limited to the sequence of steps disclosed, but rather only to the inventive concept as defined by the appended claims.

What is claimed is:

1. A method for making a color-patterned laminated plastic sheet comprising the steps of: placing sections of partially polymerized pigmented and still further polymerizable resin pieces between layers of liquid polymerizable resin; and then fully polymerizing said resin layers and said sections of partially polymerized pigmented resin to form an integral, rigid, laminated sheet.

2. A method for making a color-patterned plastic sheet comprising the steps of: placing a partially polymerized pigmented but still further polymerizable resin piece between layers of liquid polymerizable resin and fiber glass; and then fully polymerizing said resin layers and partially polymerized resin piece to form an integral, rigid, colored sheet.

3. A method for making a color-patterned plastic sheet comprising the steps of: placing a partially polymerized pigmented but still further polymerizable polyester resin piece containing fiber glass between layers of liquid polymerizable polyester resin commingled with fiber glass; and then fully polymerizing said resin layers and said partially polymerized polyester resin piece to form an integral, rigid, colored sheet.

4. A method for making a color-patterned plastic sheet comprising the steps of: admixing a polymerizable liquid resin with fiber glass; covering said admixture with sections of partially polymerized pigmented but still further polymerizable resin sheets containing fiber glass; covering said sheet sections with an additional admixture of polymerizable liquid resin and fiber glass; and then fully polymerizing said admixtures and partially polymerized resin sections to form an integral, rigid, color-patterned sheet.

5. A method for making a color-patterned reinforced plastic sheet comprising the steps of: admixing a polymerizable liquid resin with structural reinforcing means; covering said admixture with sections of partially polymerized pigmented but still further polymerizable resin sheets containing structural reinforcing means; covering said sheet sections with an additional admixture of polymerizable liquid resin and structural reinforcing means; and then fully polymerizing said admixtures and partially polymerized resin sections to form an integral, rigid, color-patterned sheet.

6. A method for making a color-patterned plastic sheet comprising the steps of: supporting a layer of unwoven fiber glass mat; pouring unpigmented liquid polymerizable resin over said fiber glass; placing pieces of partially polymerized pigmented polymerizable resin sheets containing fiber glass over the fiber glass layer and liquid resin; laying additional fiber glass over said pieces; pouring additional unpigmented liquid polymerizable resin over said additional fiber glass; polymerizing said liquid resin and partially polymerized resin pieces for approximately 45 minutes to form a laminated color-patterned sheet; and baking said laminated sheet for about 1 hour at approximately 225° F. to form an integral, rigid sheet.

7. A method for making a color-patterned plastic sheet comprising the steps of: supporting a layer of unwoven fiber glass mat; pouring unpigmented liquid polymerizable resin over said fiber glass; placing multi-colored pieces of partially polymerized pigmented resin sheets containing fiber glass over the fiber glass layer and liquid resin; laying additional fiber glass mat over said pieces; pouring additional unpigmented liquid polymerizable resin over said additional fiber glass; covering the assembly; rolling the covered assembly to expel air; polymerizing said liquid resin and partially polymerized resin pieces for approximately 45 minutes to form a laminated color-patterned sheet; and baking said laminated sheet for about 1 hour at approximately 225° F. to form an integral, rigid sheet.

8. A method for making a color-patterned plastic sheet comprising the steps of: supporting a layer of unwoven fiber glass mat; pouring pigmented liquid polymerizable resin over said fiber glass; partially polymerizing said resin to form a rigid sheet; cutting said sheet to pieces of various shapes and sizes; supporting a second layer of unwoven fiber glass mat; pouring unpigmented liquid polymerizable resin over said layer; placing the cut pieces over the second layer of fiber glass and liquid resin; covering the pieces with additional fiber glass mat; pouring additional unpigmented liquid polymerizable resin over the additional fiber glass; covering the assembly; rolling the covered assembly to expel air; and polymerizing said liquid resin and partially polymerized pieces to form an integral, rigid, laminated color-patterned sheet.

9. A method for making a color-patterned plastic sheet comprising the steps of: supporting a layer of unwoven fiber glass mat; pouring pigmented liquid polyester resin over said fiber glass; partially polymerizing said resin to form a rigid sheet; cutting said sheet to pieces of various shapes and sizes; supporting a second layer of fiber glass mat; pouring unpigmented liquid polyester resin over said fiber glass; placing the cut pieces over the second fiber glass layer and liquid polyester resin; covering the cut pieces with additional fiber glass mat; pouring additional unpigmented liquid polyester resin over the additional fiber glass; covering the assembly; rolling the covered assembly to expel air; polymerizing said liquid polyester resin and partially polymerized polyester pieces for approximately 45 minutes to form a laminated color-patterned sheet; and baking said laminated sheet for about 1 hour at approximately 225° F. to form an integral, rigid sheet.

(References on following page)

References Cited in the file of this patent

UNITED STATES PATENTS

| | | |
|---|---|---|
| 1,370,023 | Kempton | Mar. 1, 1921 |
| 1,668,590 | Hilfreich | May 8, 1928 |
| 2,428,977 | Mares | Oct. 14, 1947 |
| 2,485,294 | Kropa | Oct. 18, 1949 |
| 2,555,505 | Plumbo | June 5, 1951 |
| 2,596,162 | Muskat | May 13, 1952 |
| 2,688,580 | Fingerhut | Sept. 7, 1954 |
| 2,743,207 | Rusch | Apr. 24, 1956 |
| 2,817,619 | Bickel et al. | Dec. 24, 1957 |

FOREIGN PATENTS

| | | |
|---|---|---|
| 504,905 | Great Britain | May 2, 1939 |